Sept. 2, 1958  J. DUBROVIN  2,849,863
HYDRAULIC VARIABLE SPEED DRIVE DEVICE
Filed July 20, 1954
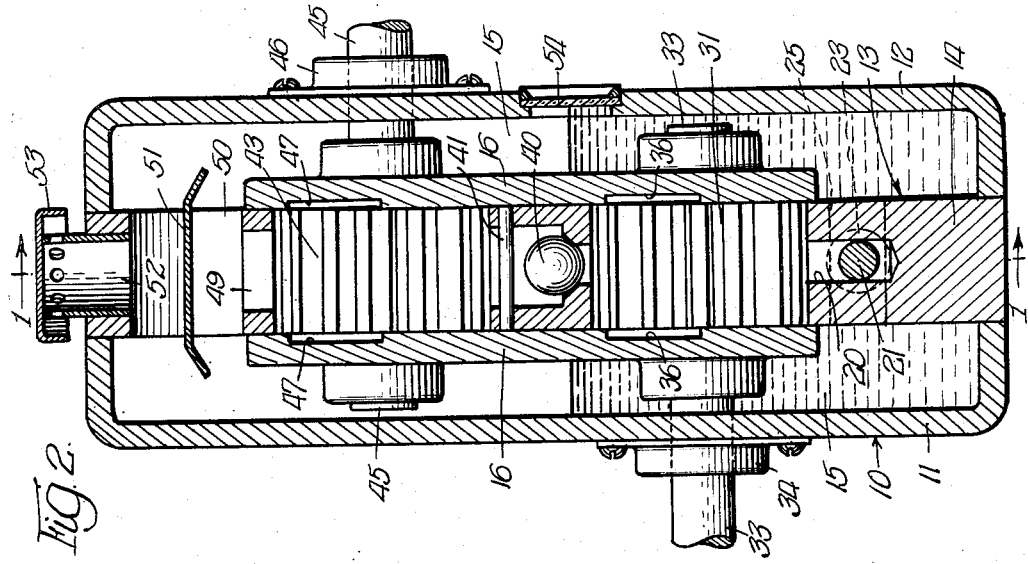
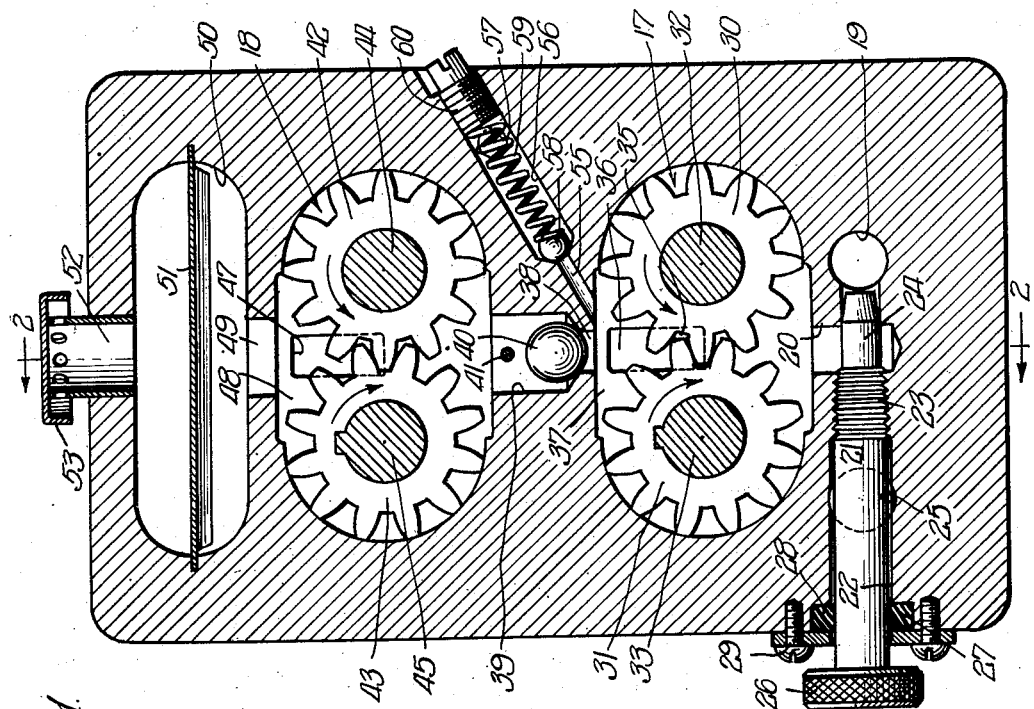
INVENTOR.
John Dubrovin,
BY
Cromwell, Greist & Warden
Attys

United States Patent Office 2,849,863
Patented Sept. 2, 1958

2,849,863

HYDRAULIC VARIABLE SPEED DRIVE DEVICE

John Dubrovin, Chicago, Ill., assignor to W. M. Welch Manufacturing Company, Chicago, Ill., a corporation of Illinois Application July 20, 1954, Serial No. 444,495

1 Claim. (Cl. 60—53)

The present invention relates to improvements in a hydraulically operating, variable speed coupling, drive device or transmission for transmitting mechanical power in a wide and flexible range of output speeds, for a given prime mover or input speed.

The device is extremely simple and rugged in character, and embodies provisions whereby under no condition of overload at its power output side, or of liquid shut-off operation in its hydraulic system, can either the coupling itself or a driver therefor be damaged as the result of that condition. This primarily arises from the fact that an anti-return flow check member is arranged in a pressure line or passage connecting component pump or impeller and driven or motor units of the coupling, and that an adjustable regulator valve is disposed in a liquid intake line to the pump unit. The pump and motor units are well sealed against ingress of air to the hydraulic system, with the result that the former will simply operate as a vacuum pump, with zero liquid discharge and zero return flow past the check member, in the event of shut-off at the intake. An overload relief valve is also provided to void liquid when the pump will not drive the motor at standard prime mover speed thus preventing overtaxing of the latter.

The coupling is structurally very compact, rugged and simple, being entirely self-contained and not reliant on any external hydraulic supply. This is afforded by a sump surrounding the casing of the pump-motor units and confined by an external housing structure applied to the sides of the casing. The sump also serves as a seal against entry of air to the hydraulic system of the coupling, and as a receiver for liquid discharged by the units, either at the discharge side of the motor unit or through a valve-controlled over-pressure relief line.

As illustrated herein, the coupling essentially comprises a casing providing distinct pumping and motor stator cavities, in which an impeller or pump unit and a driven or motor unit are respectively mounted. Although different types of pump and motor units may be employed in these cavities, with corresponding alteration in the nature of the cavities, they are shown as sets of meshing gears having close fit with the sides and semi-circular stator ends of the cavities. One of the pump gears is adapted to be driven from a motor or other suitable prime mover by a driving shaft extending through an external housing wall, the other pump gear being an idler; while one of the motor gears also has a driven shaft extending through a housing wall. The other motor gear is an idler.

The combined pump-motor gear casing is enclosed at its sides by housing sections, as mentioned above, and a suitable hydraulic pressure liquid, such as a high grade motor oil, is contained in a sump between these sections and the sides of the gear casing. The pump cavity of the latter is communicated through an intake passage with the hydraulic liquid, this intake being controlled by a variably adjustable, manually actuable valve. The valve is manipulable between positions fully opening and fully closing the intake passage, and in this range of settings, it controls the power output of the coupling in a wide range of speeds, either above or below normal, full capacity operating speed, depending on the relative sizes of the respective rotative pump and motor units. In this operation, liquid discharged by the meshing gears of the pumping unit operates on the meshing gears of the motor unit to drive the same at a speed determined by the setting of the valve referred to above.

The pressure passage communicating the pump and motor cavities is a vertically extending one, and an anti-return flow check valve controls this passage to establish one-way flow therein, i. e., solely from the pump to the motor cavity. The check valve and manually adjustable intake control valve are of essential importance in the operation of the coupling throughout its full range of output speed variations. One limit of this range is at a shut-off condition, in which the adjustable regulating or control valve is closed, and in which the pump gears operate under vacuum and with zero volumetric efficiency as a liquid pump. Return flow of hydraulic liquid to the pump cavity is then prevented by the check valve. The opposite limit of the range is of course full speed at the output shaft of one of the motor unit gears.

A further, adjustably spring urged relief valve is also provided to void liquid externally of the gear casing to the sump to the coupling in the event of an overload on the output haft of the motor unit. In this respect and in others the coupling is an entirely self-contained one, insofar as its liquid supply source in the sump and its provisions for circulating liquid therefrom, through the pump and motor cavities and back to the sump are concerned.

In the illustrated embodiment of the invention, the shape and liquid holding capacity of the motor and pump cavities and the size of the respective gears therein are equal, with the result that full speed operation of the pump unit will drive the motor unit at the same speed as the prime mover and pump unit. Variable speed drive, but in a range beneath normal full capacity speed, is accomplished by manipulating the regulating valve toward shut-off of the intake line to the pump.

In another contemplated installation, the motor gears and cavity will be of different size than the pump gears and cavity, smaller or larger respectively, to elevate or lower the level of the range of available output speeds. In still another, the control or regulating valve may be dispensed with or left at a fixed adjustment, the coupling then operating as a fixed ratio power transmission incapable of being damaged or causing damage to a prime mover when overloaded, even to a stall, as will be hereinafter referred to.

In any installation, and particularly when the liquid intake passage is partially or wholly shut-off, so that liquid admitted to the pump cavity is less than the capacity of the pump gears, and the unfilled part of the cavity is under a vacuum, provision must be made to prevent air entering the pump cavity. The present coupling does this in one way through the agency of the anti-return flow check valve in the pressure passage between cavities, as stated above. Thus insurance is had that the pump cavity will never become vapor or gas bound in the operation of the coupling. Secondly, the liquid sump is kept filled with liquid to a sufficiently high level to submerge the pump cavity and the bearings and shafting of the pump gears. In addition, a liquid seal is provided for the control valve, thus preventing entry of air along this path.

In a further important respect, the pump gears have precise, close tolerance fitting, both in relation to one another and to the stator walls of the pump cavity, so as to act as a vacuum seal at such time as the flow of liquid to the pump chamber is reduced to zero by entirely shutting-off the adjustable regulating or control valve referred to above. In this condition, the pump gears can continue to rotate at full input shaft speed, without any damage to the coupling, or a motor or the like driving the shaft. The volumetric efficiency as a liquid pump having been reduced to zero and the pump gears functioning only as a vacuum pump, there is a zero delivery of liquid at the output side of the pump cavity and zero pressure effective against the motor gears to drive the same.

Considered as a variable speed coupling, the improvement has great practical value because of simplicity and inexpensiveness of construction. There is at present no satisfactory, moderate cost means to produce variable speed adjustment of the output of an alternating current motor, for example, especially where very low speeds are required. The present coupling satisfies this need admirably.

Considering the improvement simply as a fixed ratio power transmission unit, i. e., in which a regulating valve does not come into play, the coupling also has numerous advantages. By setting its spring urged overpressure relief valve for a predetermined load on the output shaft, the coupling can be associated with an electric motor of the correct size and even when harnessed to a sufficiently heavy load to stall the output shaft, the pump continues to rotate at full output speed of the motor without harming it, the pump discharge being voided past the relief valve to the sump. Another specific feature of the construction is that it operates on an open hydraulic circuit principle, both in the voiding of an overpressure condition, as just described, and in the return to the sump of liquid discharged from the motor gear cavity. It simply overflows the gear casing, returning gravitationally to the sump.

The foregoing statements are indicative in a general way of the nature of the invention. Other and more specific objects will be apparent to those skilled in the art upon a full understanding of the construction and operation of the improved coupling.

A single embodiment of the invention is presented herein for purpose of illustration. It will be appreciated that the invention may be incorporated in other modified forms coming equally within the scope of the appended claim.

In the drawings:

Fig. 1 is a view in transverse vertical section through the coupling in a plane at a right angle to the pump and motor gear axes, i. e., along the central section line 1—1 of Fig. 2; and Fig. 2 is a view in section paralleling said axes along line 2—2 of Fig. 1.

The improved coupling comprises an outer housing, generally designated 10, made up of a pair of similar, rigid hollow housing sections 11, 12 of rectangular outline, being in fluid-tight relation to the latter; these are fixedly bolted or otherwise secured in any appropriate manner to a heavy block-like gear casing body of similar outline, generally designated by the reference numeral 13. An external housing thus constituted by sections 11, 12 provides a liquid sump 15 in spaces on either side of the gear casing 13, between the same and the respective housing sections.

The gear casing is completed by a pair of plates 16 appropriately secured in liquid-tight relation to opposite sides of body 13. These enclose the axial extremities of a lower pump cavity 17 and an upper motor cavity 18 which are formed in body 13, being coextensive in width.

A supply of hydraulic operating liquid, such as a good grade of motor oil, is maintained in sump 15 at a level sufficiently high to extend well above pump cavity 17, and a horizontal intake passage 19 is formed in the casing body. This passage opens outwardly to both sides of body 13 and communicates with an upwardly extending port 20 in the body.

The gravity intake flow of liquid from sump 15 through passage 19 and port 20 is controlled by a manually adjustable regulating valve 21 received in a bore 22 in the casing. The stem of this valve extends outwardly in bore 22 through one end of the casing 13, which is at both ends flush with the ends of housing side sections 11, 12. It is threaded at 23 for longitudinal adjustment by rotation in casing body 13, its valve control nose 24 being sufficiently long and so fitted in the casing that it entirely shuts-off and seals port 20 when in fully forward condition, as depicted in Fig. 1 of the drawings.

In order to insure against entry of air past the valve stem 21, a transverse opening 25 is formed through the casing body, thus communicating the stem bore 22 with the liquid filled sump 15, so that a liquid seal surrounds stem 21 outwardly of its threaded portion 23. The stem is provided with a knurled hand piece 26 on the outside of the coupling. It is further provided with an O-ring seal 27 frictionally surrounding the same and held in place in a groove 28 in casing 13 by means of a retaining plate 29.

Intake port 20 communicates upwardly with the pump cavity 17, in which meshing gears 30, 31 have a close tolerance fit, being likewise a close mesh with one another, as mentioned above. These gears are mounted on shafts 32, 33 borne by casing 13, of which the latter is a drive shaft adapted to be connected to a suitable prime mover and is therefore keyed to gear 31 to rotate the same. Gear 30 is an idler. Shaft 33 of course extends outwardly of housing 10, hence is provided with an appropriate seal 34 at a housing opening which accommodates and journals the same.

In order to avoid hydraulic locking of the gears 30, 31 at teeth thereof just coming into rotation, as in the small space 35 (when considering the gears to rotate in the directions indicated by arrows), shallow by-pass or relief recesses 36 are formed in side plates 16 at the location in question. These bleed-off the liquid which would otherwise be trapped, causing it to be forced around the sides of the gear teeth to the discharge space of pump cavity 17, specially designated 37.

Cavity 17 opens upwardly of space 37 and through a discharge port 38 into a ball check control chamber 39 which, along with port 38, is a part of a passage communicating cavity 17 with motor cavity 18, the chamber 39 opening directly to the latter. The upper portion of port 38 affords a conical seat on which an anti-return flow ball check 40 rests. This element is displaceable upwardly by liquid pumped by gears 30, 31, or by an equivalent impeller unit in the pump cavity, thus opening the passage between the motor cavity 18. It is limited as to its upward movement by a fixed pin 41 extending across chamber 39.

Motor cavity 18 contains a pair of meshing gears 42, 43 which, like gears 30, 31, are received with a close tolerance fit in the cavity, both at its sides and ends. They have a close tolerance mesh with one another. Gear 42 idles on a shaft 44, appropriately mounted on casing side plates 16, while gear 43 is drivingly secured to an output shaft 45 of the coupling. Shaft 45 extends outwardly through one of the housing side sections 12, being suitably journalled in the casing and section, and an oil seal 46 is applied to the shaft. Motor cavity 18 has anti-lock recesses 47 similar to pump cavity recesses 36 formed in the casing side walls 16, and operating to the same end.

A discharge space 48 of cavity 18 opens upwardly through a port or passage 49 to an overflow discharge chamber 50. This extends from side to side of casing body 13 adjacent the top thereof, and a suitable deflector or splash plate 51 is disposed horizontally across the mid point of chamber 50 to prevent liquid exiting from the motor unit from escaping outside the coupling when in operation. Oil sump 15 is filled through an opening 52 at its top which is equipped with a breather tube 53, thus insuring an entirely free air space above the liquid in the sump 15 while preventing entry of foreign matter. Otherwise, housing 10 is provided with a sealed liquid level sight window 54, to the level of which the hydraulic liquid should be maintained for proper functioning of the mechanism.

The coupling is completed by provision of an overpressure relief bore or passage 55 leading from the discharge space 37 of pump cavity 17, or some other suitable point in the pressure line between cavities 17, 18, through an aligned counterbore 56 to a transverse opening 57. Opening 57 extends out to a side of the casing and through it overpressure liquid can be voided to sump 15 when there is an overload on shaft 45. Bore 55 is controlled for this purpose by a ball check relief element 58 urged thereagainst by a coil spring 59, and the tension of the spring can be adjusted by means of a set screw 60 threaded in the body of the casing, against which spring 59 abuts.

In operation, and assuming that speed regulating control valve 21 is positioned wide open, with free communication of intake passage 19 and port 20 past valve nose 24, rotation of pump gear shaft 33 by a motor or other prime mover causes the gears 30, 31 to rotate in the direction indicated by arrow. As each gear tooth displaces liquid present in the cavity of the matching gear, the liquid is forced upwardly of discharge space 37 through port 38. The emptied gear tooth cavity is resupplied with liquid upon entering in the intake side of pump cavity 17 and impels the same upwardly about the stator portion of the pump cavity. Liquid enters the pump cavity by gravity and atmospheric pressure as the rotating gears thus create a vacuum at the intake of cavity 17.

It is evident that the volume of liquid which may be pumped in this manner to the discharge space 37 depends, other than on the size of the gears and their speed of rotation, on the volume of liquid that the valve nose 24 will admit. With the valve fully open this volume transferred represents the full pumping capacity of the gears, disregarding a slight reduction in volumetric efficiency by leakage through unavoidable clearances. The full volume of liquid pumped is forced through port 38, past antireturn flow ball check 40 and to the intake side of motor cavity 18. Since in the illustrated embodiment the motor gears are of the same size as the pump gears, the pressure of the liquid delivered to motor cavity 18 will rotate gears 42, 43 and the output shaft 45 at the same speed as gears 30, 31, again minus a few revolutions due to any reduction of volumetric efficiency by clearance leakage.

If the supply of intake liquid to the pump unit is now reduced by a partial closing of valve nose 24, a reduced amount of liquid can be pumped to motor cavity 18, so that the rotary speed of gears 42, 43 is reduced proportionately. Pump cavity 17 now operates under a partial vacuum, air being prevented from entry thereto by the elevated level of hydraulic liquid in sump 15 above the pump bearings and by the liquid seal at the stem of valve 21. Return flow of liquid from motor cavity 18 to cavity 17 is prevented by ball check 40, thus maintaining a constant filled state in passage 39 and cavity 18, to prevent entry of air into the pump cavity 17. The latter is accordingly insured against becoming vapor or gas bound.

Only an accumulation of liquid under pressure in discharge space 37 of cavity 17 which is in excess of the capacity of that space will pass into cavity 18; the pressure required must equal atmospheric pressure plus whatever additional pressure is required to overcome the load to which output shaft 45 is subject. When this pressure is overcome gears 42, 43 rotate and discharge an equal volume of liquid through passage 49, space 50 and into the sump 15.

When the valve is entirely shut and flow of liquid past valve nose 24 is zero, the pump impellers continue to rotate as a vacuum pump. There is a zero volumetric efficiency as a liquid pump, zero added pressure is applied against the motor unit, it is not rotated, and the output shaft 45 is locked against reverse rotation. In this last named condition the fitting of the gears to the impeller in the pump cavity and its stator should be so precise as to act in relation to one another and in relation to the stator as an efficient vacuum seal.

The provision of a spring loaded relief valve 58 is of particular importance when the coupling is operated as a fixed ratio transmission. It prevents overloading of the motor or other prime mover driving shaft 33, when the spring is adjusted to the required pressure, by by-passing liquid from discharge space 37 to liquid sump 15.

The illustrated arrangement, in which sets of pump and motor gears of equal size are employed, provides for regulation of the output shaft speed in a range below the normal, full capacity operation of the coupling when the valve nose 24 is fully opened, and below the normal rated speed of the prime mover. It is, of course, possible to vary speeds in a range above normal prime mover speed, or still further below the same, by utilizing pump and motor gears of different size, the effects on output shaft speed having been referred to above.

The same comments apply to installations other than one employing meshing gears, for example pump and motor units involving an arrangement of eccentric or vane-type impellers. The operations of anti-return flow ball check 40 and variably adjustable valve 24, or equivalent elements, are the same in relation to the characteristic operation of the coupling at full or partial capacity.

A simplified adaptation of the invention has been illustrated and described above, and mention has been made in the preceding paragraph regarding the substitution of equivalent elements for those shown. An example given is the use of an equivalent pumping unit for the gear type shown and an equivalent driven turbine or motor unit for the gear unit shown. The same consideration applies with reference to other components, for instance the particular speed regulating means depicted in the drawing, i. e. valve 21, which is referred to as an "adjustable regulator valve" in the claim. Generally considered, any equivalent type of flow regulating means permitting a desired range of flow control is considered within the scope of the invention as defined in the claim. Such regulating means may be manually operated, as in the illustrated form, or automatically operated so as to enable all or any phase of the operation thereof to be accomplished without manual actuation.

I claim:

A hydraulically operating unit for power transmission from a single speed power source, said unit including a housing enclosing therein a casing provided with spaced internal pump and motor cavities interconnected by an internal passage with said motor cavity being above said pump cavity, pump and motor elements mounted in their respective cavities on rotatable shafts, the shaft of said pump element being coupled with said power source, a supply of liquid in said housing surrounding the portion of said casing including said pump cavity, an inlet passage communicating said supply of liquid with said pump cavity, throttle valve means in said inlet passage to regulate the flow of liquid therethrough into said pump cavity, check valve means in said internal passage preventing reverse liquid and air flow from said motor cavity to said pump cavity, said motor cavity having a liquid discharge opening in communication with the liquid supply in said housing, the level of liquid in said housing being above said pump cavity and below the discharge opening of said motor cavity to prevent the introduction of air into said pump cavity while being inadequate to submerge said motor cavity, said housing being open to the atmosphere in association with the liquid discharge opening of said motor cavity, and a by-pass pressure relief passage in said casing communicating said pump cavity with the liquid supply in said housing, said relief passage having a flow check member therein preventing flow of liquid therethrough into said pump cavity while allowing by-pass discharge of liquid under predetermined pressure from said pump cavity.

References Cited in the file of this patent

UNITED STATES PATENTS

| | | |
|---|---|---|
| 510,600 | Hochhausen | Dec. 12, 1893 |
| 1,723,493 | Schotthoefer | Aug. 6, 1929 |
| 2,030,299 | Jack | Feb. 11, 1936 |
| 2,133,135 | Doran | Oct. 11, 1938 |
| 2,221,308 | Dischert | Nov. 12, 1940 |
| 2,268,135 | Dornhofer | Dec. 30, 1941 |
| 2,370,526 | Doran | Feb. 27, 1945 |